United States Patent
Wilby

(10) Patent No.: US 11,753,126 B2
(45) Date of Patent: Sep. 12, 2023

(54) UNDERWATER VEHICLE INSPECTION

(71) Applicant: Raytheon Company, Waltham, MA (US)

(72) Inventor: Andrew Wilby, Warwick, RI (US)

(73) Assignee: Raytheon Company, Waltham, MA (US)

(*) Notice: Subject to any disclaimer, the term of this patent is extended or adjusted under 35 U.S.C. 154(b) by 175 days.

(21) Appl. No.: 17/146,673

(22) Filed: Jan. 12, 2021

(65) Prior Publication Data

US 2022/0219796 A1      Jul. 14, 2022

(51) Int. Cl.
| | |
|---|---|
| *G06V 20/52* | (2022.01) |
| *B63G 7/08* | (2006.01) |
| *B63G 8/00* | (2006.01) |
| *B63B 79/30* | (2020.01) |
| *B63G 8/39* | (2006.01) |
| *G01S 15/88* | (2006.01) |
| *G01S 15/89* | (2006.01) |

(Continued)

(52) U.S. Cl.
CPC .............. *B63G 8/001* (2013.01); *B63B 79/30* (2020.01); *B63G 7/08* (2013.01); *B63G 8/39* (2013.01); *G01S 15/88* (2013.01); *G01S 15/8904* (2013.01); *G06V 20/52* (2022.01); *B63G 2007/005* (2013.01); *B63G 2008/004* (2013.01); *B63G 2009/005* (2013.01)

(58) Field of Classification Search
CPC . B63G 8/001; B63G 7/08; B63G 8/39; B63G 2007/005; B63G 2008/004; B63G 2009/005; B63G 7/00; B63G 7/02; B63B 79/30; G01S 15/88; G01S 15/8904; G01S 7/52004; G06V 20/52
See application file for complete search history.

(56) References Cited

U.S. PATENT DOCUMENTS

| | | | |
|---|---|---|---|
| 2011/0299733 A1* | 12/2011 | Jahangir | G01S 13/9029 |
| | | | 382/103 |
| 2012/0103245 A1 | 5/2012 | Lambertus | |
| 2015/0049588 A1* | 2/2015 | Lambertus | B63G 8/001 |
| | | | 114/144 R |

FOREIGN PATENT DOCUMENTS

| | | |
|---|---|---|
| CN | 102609933 A | 7/2012 |
| CN | 109313261 A | 2/2019 |

(Continued)

OTHER PUBLICATIONS

Hansen, Roy. "Introduction to Synthetic Aperture Sonar" Norwegian Defense Research Establishment, pub 2011. https://cdn.intechopen.com/pdfs/18868/InTech-Introduction_to_synthetic_aperture_sonar.pdf Retrieved Jan. 6, 2023 (Year: 2011).*

(Continued)

*Primary Examiner* — Andrew Polay

(74) *Attorney, Agent, or Firm* — Daly, Crowley, Mofford & Durkee, LLP

(57) ABSTRACT

Methods and apparatus for inspecting an underwater vehicle. In embodiments, a system receives a SAR image for at least a portion of an exterior surface of an underwater vehicle and performs CCD processing to compare a baseline SAS image for the underwater vehicle with the received SAR image of the underwater vehicle to generate a CCD output corresponding to a measure of similarity of the baseline SAS image and the received SAS image. The system determines whether there was tampering of the underwater vehicle based on the measure of similarity.

20 Claims, 5 Drawing Sheets

(51) Int. Cl.
  *B63G 7/00* (2006.01)
  *B63G 9/00* (2006.01)

(56) References Cited

FOREIGN PATENT DOCUMENTS

| WO | WO 2015/049678 A1 | 4/2015 | |
|---|---|---|---|
| WO | WO-2015049678 A1 * | 4/2015 | ............ B63G 7/02 |
| WO | WO 2017/095539 A1 | 6/2017 | |

OTHER PUBLICATIONS

Midtgaard et al., "Change Detection Using Synthetic Aperture Sonar: Preliminary Results from the Larvik Trial;" Oceans 2011 MTS/IEEE KONA; Sep. 19, 2011; 8 Pages.

Sternlicht et al., "Advanced Sonar Technologies for High Clearance Rate Mine Countermeasures;" Oceans 2016 MTD/IEEE Monterey; Sep. 19, 2016; 8 Pages.

PCT International Search Report and Written Opinion dated Apr. 14, 2022 for International Application No. PCT/US2021/061571; 14 Pages.

Taiwan Office Action (with English Translation) dated Sep. 23, 2022 for Taiwan Application No. 110146287; 19 Pages.

* cited by examiner

UNDERWATER VEHICLE INSPECTION

BACKGROUND

As is known in the art, imaging systems can image the exterior surface of the hulls of ships. Some known systems require up close inspection while others attempt to image hulls using sidescans from the seabed. The images obtained in these systems are difficult to interpret because of oblique angles to the hull causing geometric distortion. In addition, data may have limited resolution that may miss subtle changes to the hull. Some conventional systems may require large sensor arrays to obtain image data.

SUMMARY

Embodiments of the disclosure provide methods and apparatus for inspecting underwater vehicles, such as unmanned underwater vehicles (UUVs), upon their return. In some applications, UUVs are launched from a submarine or ship to perform reconnaissance activity after which the UUVs return at the conclusion of the mission. In embodiments, an inspection system images and analyzes the exterior surface of the returned UUV to detect any changes. For example, an explosive device attached to the UUV can be detected by the inspection system.

In embodiments, an inspection system includes one or more sensors to create a series of baseline high frequency, synthetic aperture sonar (SAS) images of the UUV prior to the start of the mission and uses coherent change detection (CCD) processing to compare the baselines images with images created upon return of the vehicle. In an example embodiment, an inspection system uses three passes of the UUV with respect to the sensor(s) at a given stand off distance, such as in the order of 100 m, with a detection sensitivity of the order of 0.5 mm. With this example arrangement, an inspection system can detect a change in the shape of the UUV caused by tampering of some kind. By inspecting returning UUVs to detect tampering, the host platform, e.g., ship or submarine, can be protected.

In one aspect, a method comprises: receiving a SAS image for at least a portion of an exterior surface of an underwater vehicle; performing coherent change detection processing to compare a baseline SAS image for the underwater vehicle with the received SAS image of the underwater vehicle to generate a CCD output corresponding to a measure of similarity of the baseline SAS image and the received SAS image; and determining whether there was tampering of the underwater vehicle based on the measure of similarity.

In another aspect, an apparatus comprises: a processor and memory configured to: receive a SAS image for at least a portion of an exterior surface of an underwater vehicle; perform coherent change detection processing to compare a baseline SAS image for the underwater vehicle with the received SAS image of the underwater vehicle to generate a CCD output corresponding to a measure of similarity of the baseline SAS image and the received SAS image; and determine whether there was tampering of the underwater vehicle based on the measure of similarity.

In a further aspect, an article comprises a non-transitory computer readable medium having stored instructions that enable a machine to: receive a SAS image for at least a portion of an exterior surface of an underwater vehicle; perform coherent change detection processing to compare a baseline SAS image for the underwater vehicle with the received SAS image of the underwater vehicle to generate a CCD output corresponding to a measure of similarity of the baseline SAS image and the received SAS image; and determine whether there was tampering of the underwater vehicle based on the measure of similarity.

BRIEF DESCRIPTION OF THE DRAWINGS

The foregoing features of this invention, as well as the invention itself, may be more fully understood from the following description of the drawings in which.

DETAILED DESCRIPTION

Figure 1:
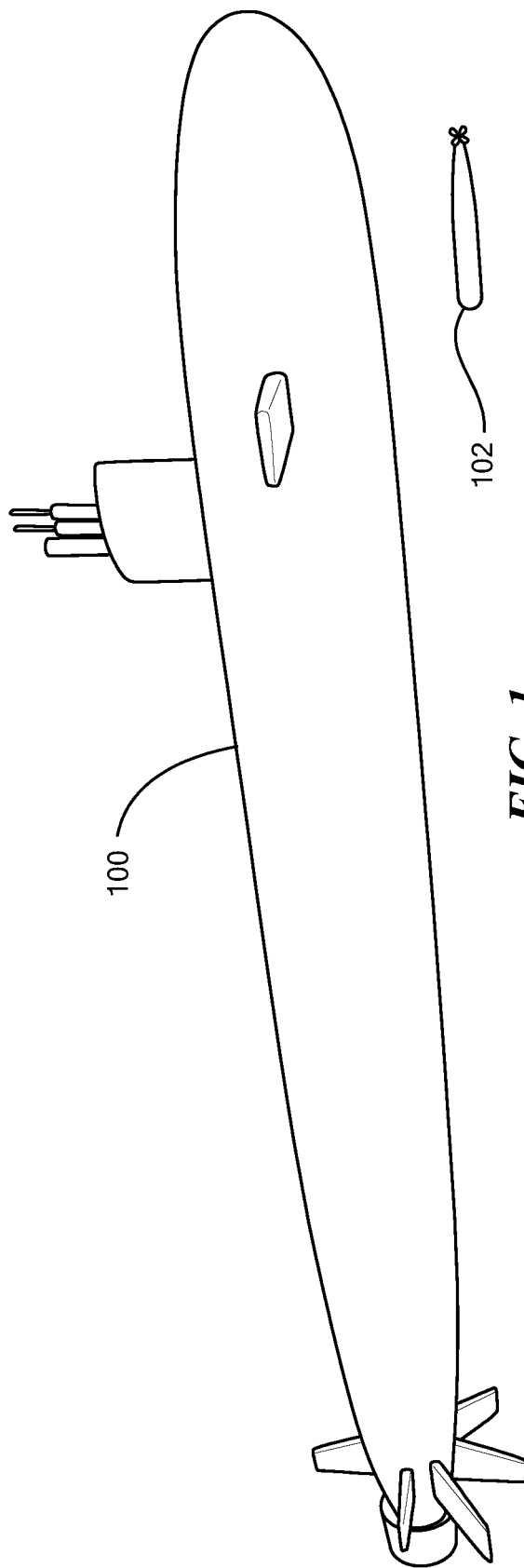
FIG. 1 is a pictorial representation of submarine that can host and inspect an underwater vehicle in accordance with example embodiments of the disclosure.

FIG. 1 shows an example host vehicle 100, which can comprise a ship or submarine, that can launch an unmanned underwater vehicle (UUV) 102 and inspect the UUV upon return in accordance with example embodiments of the disclosure. An exterior surface of the UUV 102 can be inspected to detect any tampering that may impact the host vehicle 100. As described more fully below, the inspection system can be configured to inspect an exterior surface of the UUV 102 using synthetic aperture sonar (SAS) images processed using coherent change detection (CCD) to detect any changes to the UUV exterior since launch. Changes to the UUV exterior surface can comprise a variety of contraband material or systems, such as chemicals, biological materials, incendiary devices, explosives, tracking devices, and the like.

As used herein, tampering refers to any unauthorized addition of materials or intentional damage to an exterior surface of a vehicle. For example, a bad actor may attach explosives to an underwater vehicle with the intention of damaging the host vehicle after the underwater vehicle returns from a mission.

Figure 2:
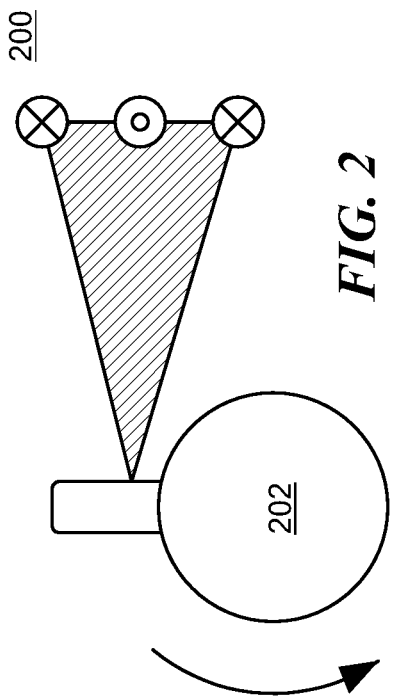
FIG. 2 is a schematic representation of an example underwater vehicle being inspected by an inspection system in accordance with example embodiments of the disclosure.

FIG. 2 shows a high-level diagram of an inspection system 200 for inspecting the exterior surface of a UUV 202. In an example embodiment, the inspection system 200 comprises a synthetic aperture sonar (SAS) system to obtain images of the UUV 202 as one or both of the UUV or SAS sensor move with respect to each other. In the illustrated embodiment, a first pass 204 obtains images with relative motion into the page indicated by the X in the circle. A second pass 206 can obtain images with relative motion coming out of the page as indicated by a dot in the middle of the circle. A third pass 208 obtain images with relative motion into the page as indicated by the X in the circle. The UUV 202 (or sensor) may rotate by 120 degrees after each pass to enable inspection of the entire UUV exterior surface. In one embodiment, each of the three passes 204, 206, 208 can cover about 120 degrees of the UUV 202 exterior surface for a total of 360 degree coverage. As described more fully below, coherent change detection (CCD) processing can be used to detect any changes on the exterior surface of the UUV 202.

While example embodiments are shown in conjunction with particular vehicles that operate in or underwater, it is understood that embodiments of the disclosure are applicable to inspection systems in general for which it is desirable to detect changes in a surface. It is understood that relative motion of the image-obtaining sensors and a vehicle can be achieved in a wide variety of ways. For example, the vehicle may be secured in a fixed position while at least a sensor of an inspection system moves in relation to a surface of the vehicle. In other embodiments, at least a sensor of an inspection system is fixed in position while the vehicle is moved in relation to the sensor. In some embodiments, at least the sensor of the inspection system and the vehicle both move in relation to each other in a pattern configured to obtain the desired images.

As used herein, SAS refers to a type of sonar that images an object in two or three dimensions by using relative motion of a radar sensor over a target region (or vice-versa or movement of both) to provide finer spatial resolution than conventional beam-scanning radars. The distance the SAS device travels over a target in the time taken for the sonar pulses to return to the antenna creates a synthetic aperture for the sonar where aperture size corresponds to resolution of the images. Thus, a SAS system can create high-resolution images with comparatively small physical antennas. To create a SAS image, successive pulses are transmitted to illuminate a region that may include a target. Transmitted pulses reflect from the target that can be received as signal return. The transmitted and received signals can be beam-formed to meet the needs of a particular application. The signal return can be processed to combine signals from multiple antenna positions to provide a synthetic antenna aperture. In general, the range direction is parallel to target movement and perpendicular to the azimuth direction, which is also known as along-track.

In embodiments, 3D processing includes initial processing in azimuth and range direction to generate of 2D (azimuth-range) high-resolution images, after which a digital elevation model (DEM) is used to measure the phase differences between complex images, which is determined from different look angles to recover the height information. This height information, along with the azimuth-range coordinates provided by 2-D SAS focusing, gives the third dimension, which is the elevation.

Figure 3:
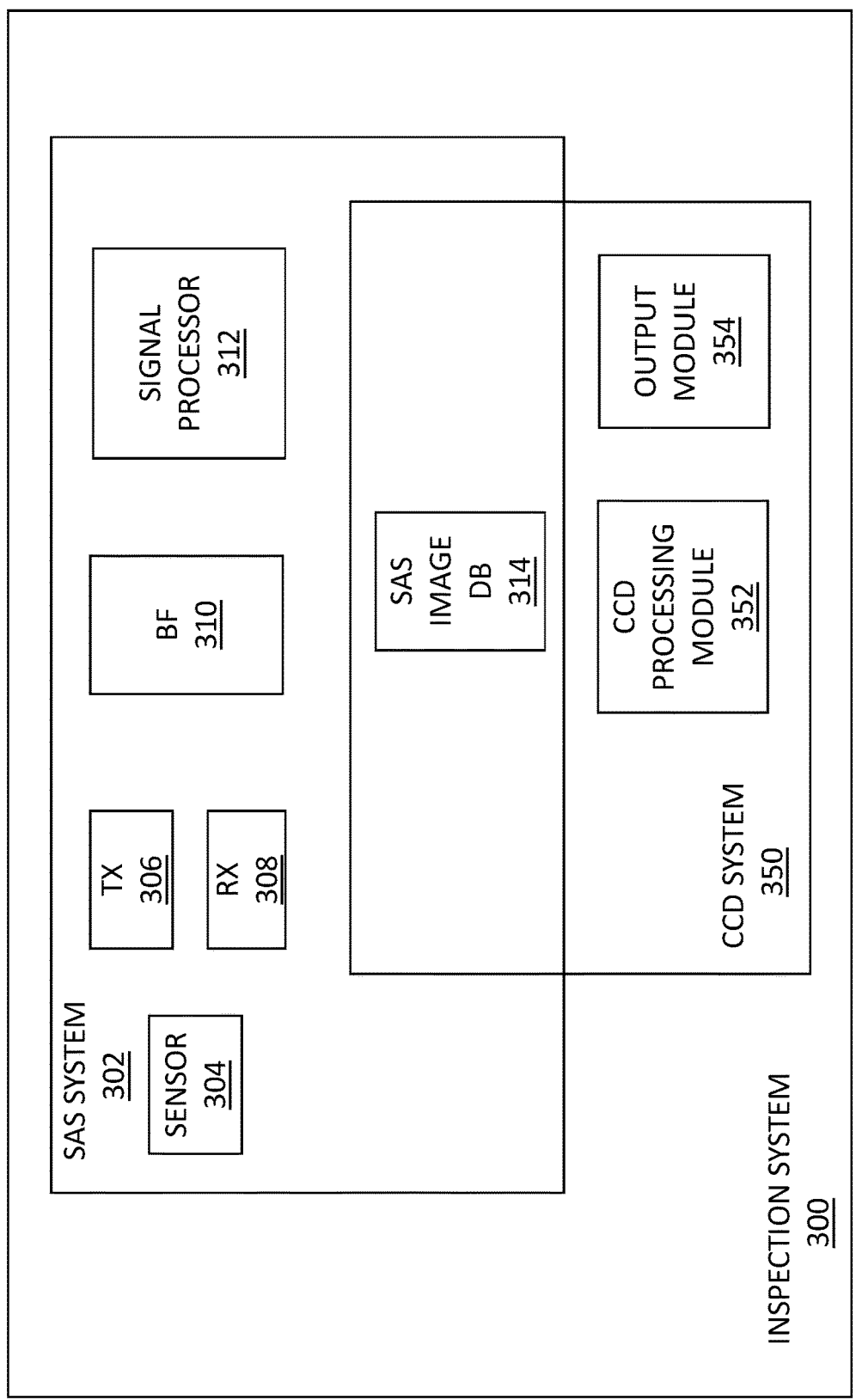
FIG. 3 is a high level block diagram of an example embodiment of a underwater vehicle inspection system in accordance with illustrative embodiments of the disclosure.

FIG. 3 shows an example inspection system 300 having a SAS system 302 for obtaining images of an unmanned underwater vehicle (UUV) 304 and a CCD system 350 for detecting changes in the surface of the UUV from baseline SAS images in accordance with illustrative embodiments of the disclosure.

Coherent Change Detection (CCD) refers to processing techniques for comparing images in amplitude and phase to detect changes from a baseline image(s) to a more recent image(s). CCD processing can be used for images obtained from a SAS system. CCD can be considered as superimposing images on top of each other to detect amplitude differences while also accounting for phase for coherent processing. It will be appreciated that amplitude differences alone can be considered non-coherent change detection (NCCD).

The SAS system 302 comprises a sensor 304, such as an antenna, for generating SAS images. The antenna 304 of the SAS system gathers SAS data by scanning a field of view that includes a UUV. A transmit module 306 and a receive module 308 are selectively enabled to transmit and receive signals to/from the antenna 304. In embodiments, transmit and receive systems are separate from each other and may have independent antennas. A beam forming module 310 can form transmit and/or receive beams in a desired pattern. A signal processing module 312 can generate signals for transmission and process signal return to generate SAS images. A SAS image database 314 can store baseline SAS images for various UUVs and can store SAS images created for a recently returned UUV upon mission completion.

A number of passes can be made by the sensor 304 or the UUV to achieve relative motion to obtain the SAR images that can be stored in the database 314. In embodiments, baseline SAS images are obtained prior to deployment of the UUV. It is understood that the SAS system can take any practical number of passes of a vehicle to achieve a desired resolution to meet the needs of a particular application.

The CCD system 350 can access the SAS image database 314 for processing SAS images. The CCD system 350 can include a CCD processing module 352 that can compare baseline SAS images for a given UUV with more recent SAS images for the UUV. An output module 354 can include a display that may show CCD results of a UUV inspection upon return. The CCD processing module 352 can generate a measure of similarity of the baseline and recent SAS images. In embodiments, the measure of similarity is indicative of a change in the surface of the UUV of at least 0.5 mm and/or one fifth of the wavelength of the transmitted signal.

The CCD processing of the SAS images can vary to meet the needs of a particular application. In an example embodiment, CCD processing comprises four processing stages: Firstly a coarse alignment stage that relates the approximate position of the target for the two passes. Secondly a fine scale co-registration, matching the features between the two images, Thirdly a local co-registration phase to improve phase coherence actor the image, and finally an algorithm to detect phase differences between the two images.

Figure 4:
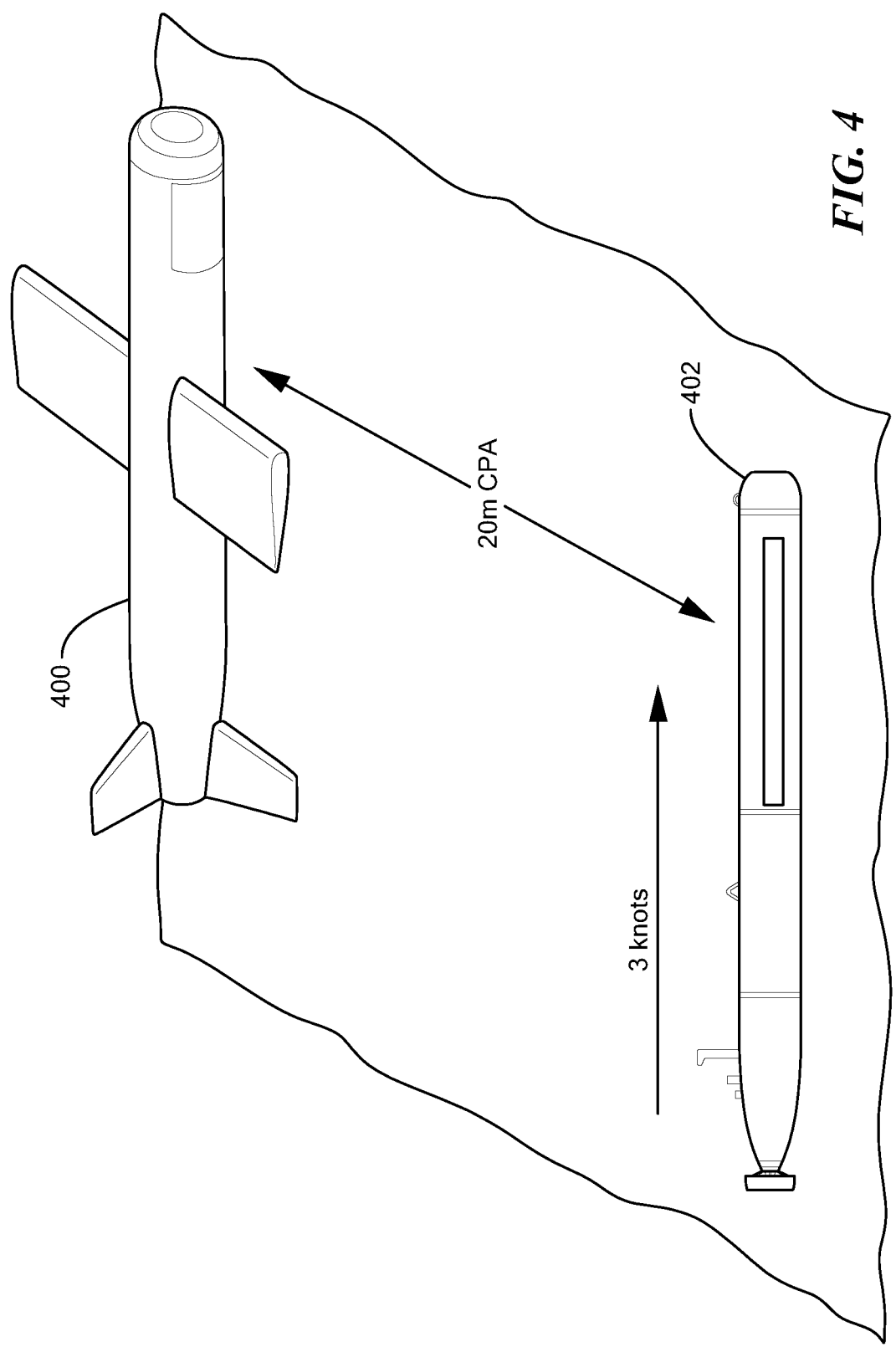
FIG. 4 is a schematic representation of an underwater vehicle at a standoff distance from a host underwater vehicle having an inspection system.

FIG. 4 shows an example SAS image collection configuration where a manned or unmanned underwater host vehicle 400 obtains images of an underwater vehicle 402 for which inspection is desirable. The underwater vehicle 400 can comprise a minehunter type of submarine having a high frequency wideband SAS-type sonar that can provide optical level identification of small objects.

In embodiments, a linear sensor array for the SAS system can be used. With a physical aperture sidescan from a narrow azimuthal beam by focusing a large set of elements, a synthetic aperture sonar builds an arbitrarily long array by coherently combining data from a number of receivers as the array passes by the target, or vice-versa. This allows resolution independent of range and allows formation of high azimuthal resolution images at ranges which would not be possible without an impossibly long physical array. The length of the physical array depends on the range between the array and the target, and the relative speed with which the sensor passes the target (or vice versa). If the relative velocities of the two objects are well controlled, then accurate results can be obtained with a relatively short array. In embodiments, array length can vary from about less than 0.1 m to several meters in length, depending on the relative speeds of the wo platforms and the required stand off distance at closest point of approach.

Figure 5:
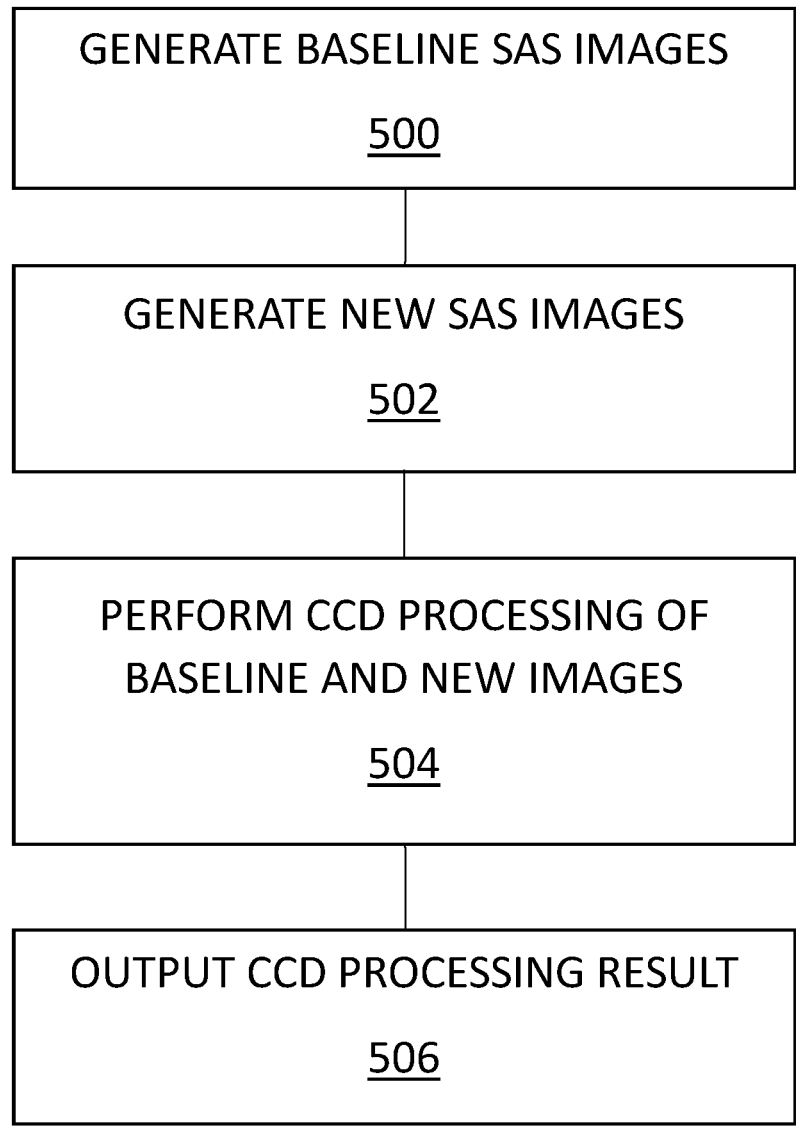
FIG. 5 is a flow diagram showing an example sequence of steps for inspecting an underwater vehicle in accordance with example embodiments of the disclosure.

FIG. 5 shows an example sequence of steps for performing inspection of an underwater vehicle in accordance with example embodiments of the disclosure. In step 500, a SAS system of an inspection system generates baseline images of an underwater vehicle. Relative motion of the SAS system sensor and the underwater vehicle is achieved by movement of the sensor and/or the underwater vehicle in a selected pattern to obtain the desired images. In step 502, the SAS system generates new images of the underwater vehicle, such as after the vehicle has returned form a mission. In step 504, CCD processing is performed to compare the baseline SAS images and the new SAS images to inspect the surface of the underwater vehicle to detect any tampering. In step 506, an output of the CCD processing indicates whether tampering has been detected.

Figure 6:
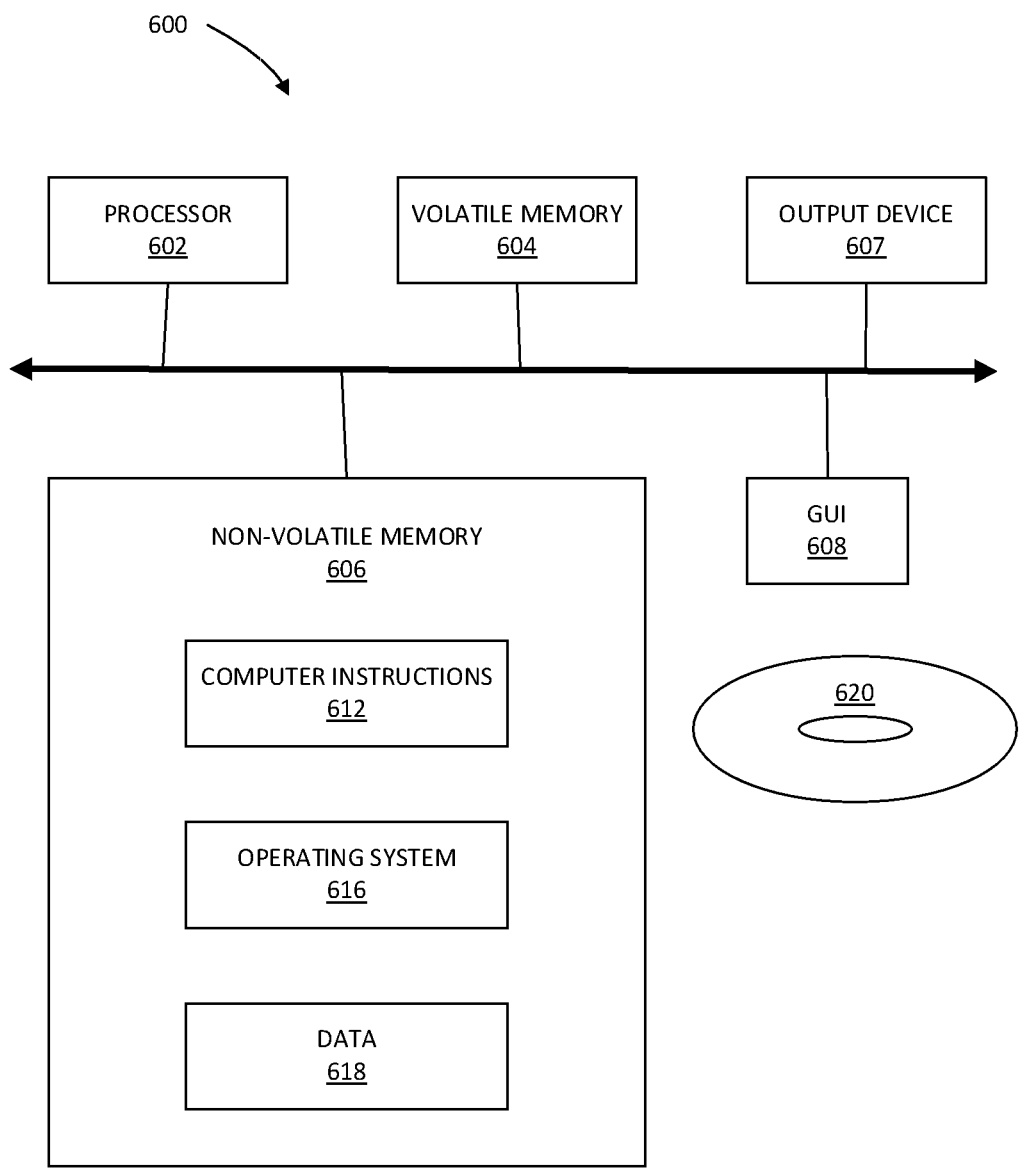
FIG. 6 is a schematic representation of an example computer than can perform at least a portion of the processing described herein.

FIG. 6 shows an exemplary computer 600 that can perform at least part of the processing described herein, such as the processing of FIGS. 1, 2, 3, and 4. For example, the computer 600 can perform processing to generate SAR images and perform CCD image processing to detect tampering of an underwater vehicle, as described herein. The computer 600 includes a processor 602, a volatile memory 604, a non-volatile memory 606 (e.g., hard disk), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising
receiving a SAS image for at least a portion of an exterior surface of an underwater vehicle, the received SAS image being a three-dimensional image, wherein a third dimension of the SAS image is obtained by: generating azimuth-range images of the surface, recovering height information of the surface by applying a digital elevation model (DEM) to measure phase differences between different complex images of the surface, and determining elevation based on the azimuth-range images and the height information, wherein the SAS image is generated by using a sensor to perform at least three passes over the underwater vehicle from a stand-off distance in the order of 100 m, each of the passes being arranged to cover a difference portion of the exterior surface of the underwater vehicle, each of the passes being performed with a detection sensitivity in the order or 0.5 mm;
performing coherent change detection processing to compare a baseline SAS image for the underwater vehicle with the received SAS image of the underwater vehicle to generate a CCD output corresponding to a measure of similarity of the baseline SAS image and the received SAS image; and
determining whether there was tampering of the underwater vehicle based on the measure of similarity.

2. The method according to claim 1, wherein the underwater vehicle comprises an unmanned underwater vehicle.

3. The method according to claim 1, further including receiving the SAS image after the underwater vehicle as returned from a mission to a host platform.

4. The method according to claim 1, wherein the tampering comprises attaching an explosive device.

5. The method according to claim 1, wherein the received SAS image includes at least three passes of the underwater vehicle or system for generating the SAS image.

6. The method according to claim 1, wherein determining whether there was tampering of the underwater vehicle comprises detecting a modification to the underwater vehicle exterior surface of about 0.5 mm.

7. The method according to claim 1, further including performing determining whether there was tampering of the underwater vehicle by a host platform to which the underwater vehicle is returning.

8. An apparatus, comprising:
a processor and memory configured to:
receive a SAS image for at least a portion of an exterior surface of an underwater vehicle, the received SAS image being a three-dimensional image, wherein a third dimension of the SAS image is obtained by: generating azimuth-range images of the surface, recovering height information of the surface by applying a digital elevation model (DEM) to measure phase differences between different complex images of the surface, and determining elevation based on the azimuth-range images and the height information, wherein the SAS image is generated by using a sensor to perform at least three passes over the underwater vehicle from a stand-off distance in the order of 100 m, each of the passes being arranged to cover a difference portion of the exterior surface of the underwater vehicle, each of the passes being performed with a detection sensitivity in the order or 0.5 mm;

perform coherent change detection processing to compare a baseline SAS image for the underwater vehicle with the received SAS image of the underwater vehicle to generate a CCD output corresponding to a measure of similarity of the baseline SAS image and the received SAS image; and determine whether there was tampering of the underwater vehicle based on the measure of similarity.

9. The apparatus according to claim 8, wherein the underwater vehicle comprises an unmanned underwater vehicle.

10. The apparatus according to claim 8, further including receiving the SAS image after the underwater vehicle as returned from a mission to a host platform.

11. The apparatus according to claim 8, wherein the tampering comprises attaching an explosive device.

12. The apparatus according to claim 8, wherein the received SAS image includes at least three passes of the underwater vehicle or system for generating the SAS image.

13. The apparatus according to claim 8, wherein determining whether there was tampering of the underwater vehicle comprises detecting a modification to the underwater vehicle exterior surface of about 0.5 mm.

14. The apparatus according to claim 8, further including performing determining whether there was tampering of the underwater vehicle by a host platform to which the underwater vehicle is returning.

15. An article comprising a non-transitory computer readable medium having stored instructions that enable a machine to:

receive a SAS image for at least a portion of an exterior surface of an underwater vehicle, the received SAS image being a three-dimensional image, wherein a third dimension of the SAS image is obtained by: generating azimuth-range images of the surface, recovering height information of the surface by applying a digital elevation model (DEM) to measure phase differences between different complex images of the surface, and determining elevation based on the azimuth-range images and the height information, wherein the SAS image is generated by using a sensor to perform at least three passes over the underwater vehicle from a stand-off distance in the order of 100 m, each of the passes being arranged to cover a difference portion of the exterior surface of the underwater vehicle, each of the passes being performed with a detection sensitivity in the order or 0.5 mm;

perform coherent change detection processing to compare a baseline SAS image for the underwater vehicle with the received SAS image of the underwater vehicle to generate a CCD output corresponding to a measure of similarity of the baseline SAS image and the received SAS image; and determine whether there was tampering of the underwater vehicle based on the measure of similarity.

16. The computer readable medium according to claim 15, wherein the underwater vehicle comprises an unmanned underwater vehicle.

17. The computer readable medium according to claim 16, further including instructions for receiving the SAS image after the underwater vehicle as returned from a mission to a host platform.

18. The computer readable medium according to claim 16, wherein the tampering comprises attaching an explosive device.

19. The computer readable medium according to claim 16, wherein the received SAS image includes at least three passes of the underwater vehicle or system for generating the SAS image.

20. The computer readable medium according to claim 16, wherein determining whether there was tampering of the underwater vehicle comprises detecting a modification to the underwater vehicle exterior surface of about 0.5 mm.

* * * * *